July 21 1925.　　　　　　　　　　　　　　　　　1,546,688
M. TANZOLA
STORM AND GLARE SHIELD AND METHOD OF MAKING SAME
Filed Sept. 19, 1922　　　　3 Sheets-Sheet 1
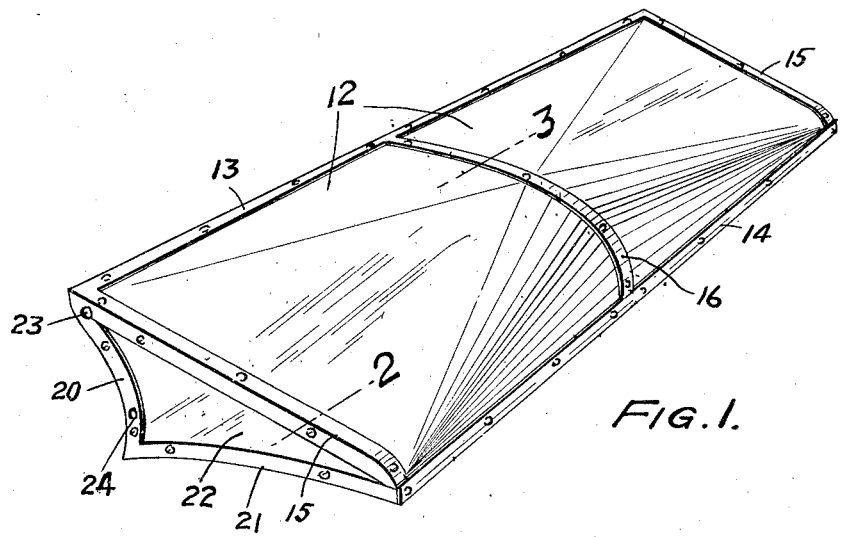
FIG.1.
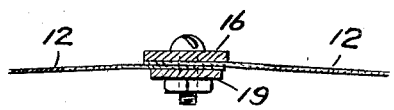
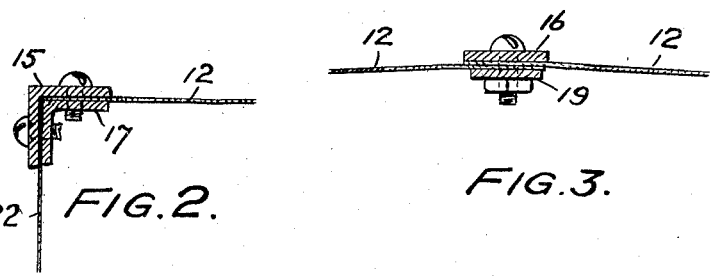
FIG.2.　　　　FIG.3.
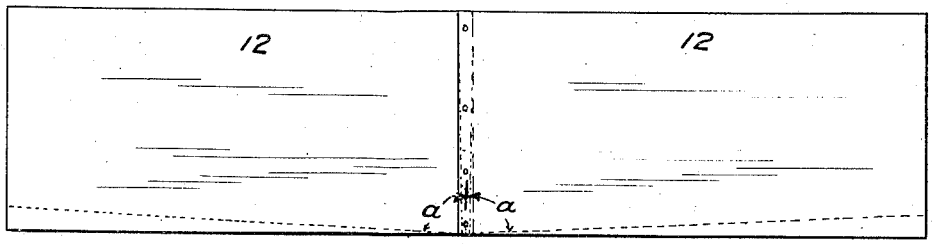
FIG.4.
WITNESS:　　　　　　　　　　　　　　　INVENTOR
　　　　　　　　　　　　　　　　　Mattheiu Tanzola
　　　　　　　　　　　　　　　　　　　BY
　　　　　　　　　　　　　　　　　　　　ATTORNEY.

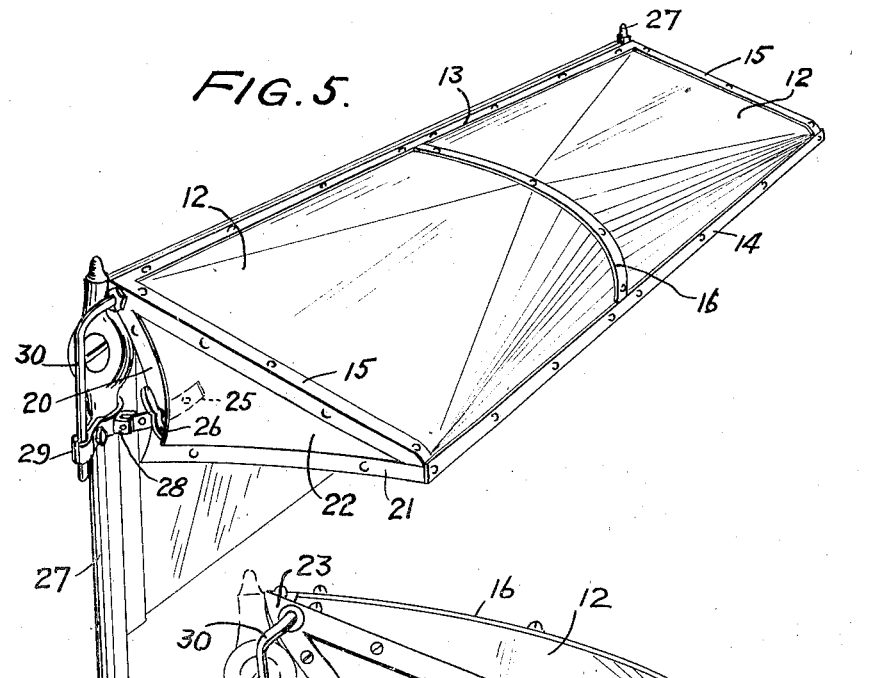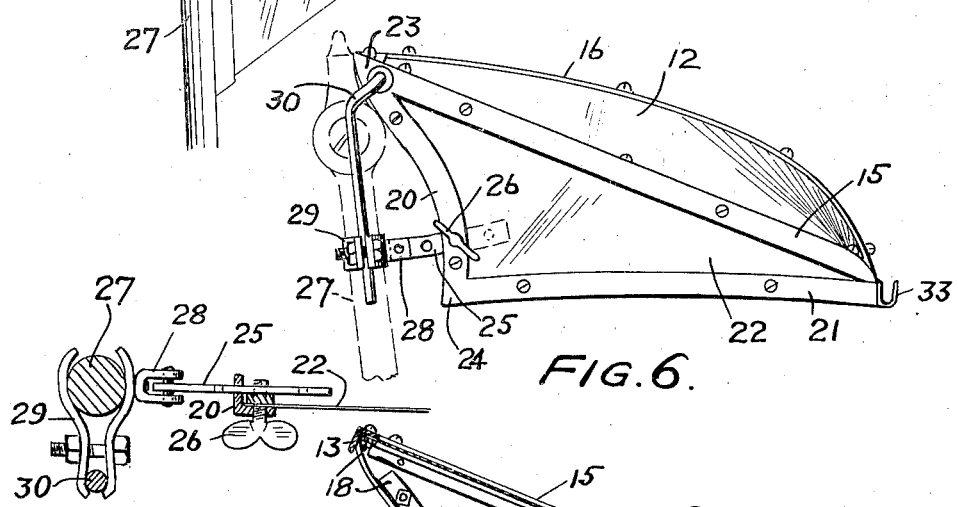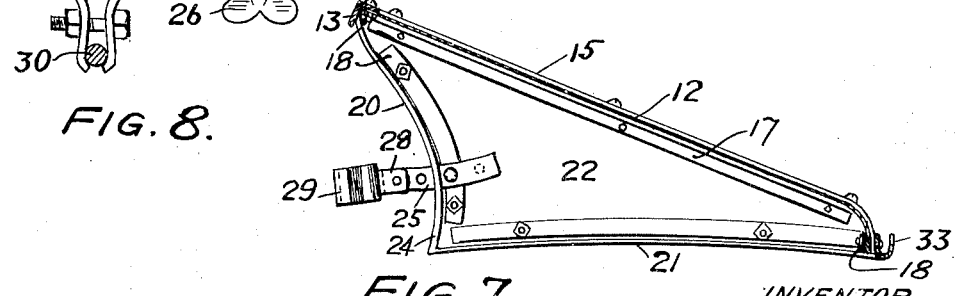

July 21 1925.
M. TANZOLA
1,546,688
STORM AND GLARE SHIELD AND METHOD OF MAKING SAME
Filed Sept. 19, 1922     3 Sheets-Sheet 3
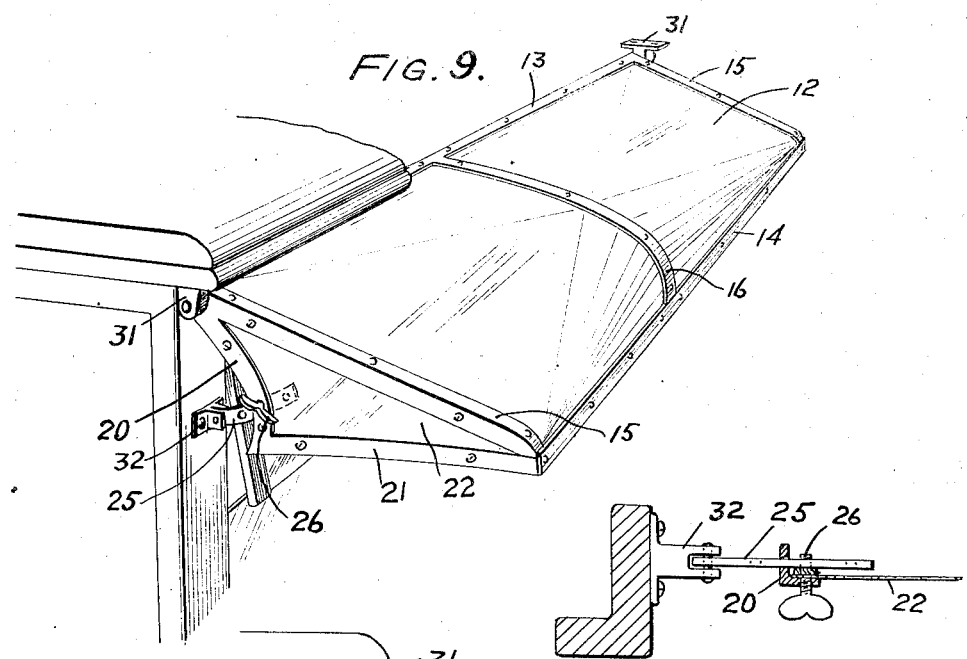
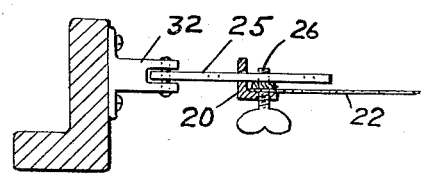
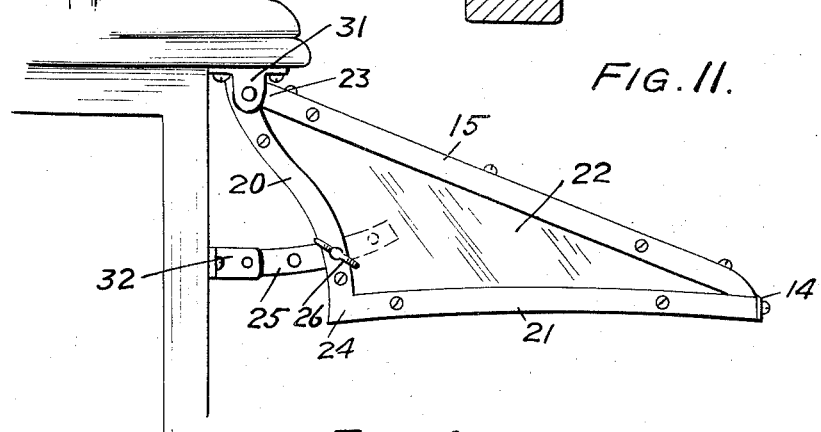
WITNESS:
INVENTOR
Mattheiu Tanzola
BY
ATTORNEY Patented July 21, 1925.

1,546,688

UNITED STATES PATENT OFFICE.

MATTHEW TANZOLA, OF NEWARK, NEW JERSEY, ASSIGNOR OF ONE-HALF TO ROBERT WEISS, OF NEWARK, NEW JERSEY.

STORM AND GLARE SHIELD AND METHOD OF MAKING SAME.

Application filed September 19, 1922. Serial No. 589,073.

*To all whom it may concern:*

Be it known that I, MATTHEW TANZOLA, a citizen of the United States, and a resident of Newark, in the county of Essex and State of New Jersey, have invented certain new and useful Improvements in Storm and Glare Shields and Methods of Making Same, of which the following is a specification.

This invention relates to improvements in storm and glare shields of the translucent type adapted to be attached to a vehicle so as to intercept the glaring rays of the sun or of arc lamps and at the same time concentrate the light with the glaring rays eliminated.

A further object of my invention is a storm and glare shield adapted to shed water in three directions frontwardly and sidewardly of the vehicle.

A still further object is a storm and glare shield adapted to be attached to a vehicle above its windshield in such a manner as to prevent rain and glaring light from striking the windshield in front of the driver's face.

A further object is a storm and glare shield adapted to be attached in front of a vehicle whether of the open or closed type, to extend obliquely downwardly and outwardly, irrespective of the inclination of the front of the vehicle.

With the above and related objects in view, this invention comprises the shield and method of making it hereinafter described, a preferred embodiment whereof is illustrated in the accompanying drawing and is embraced within the scope of the appended claims. In the said drawing:—

Fig. 1 is a perspective view of the shield.

Fig. 2 is a partial section of a corner of the shield.

Fig. 3 is a partial section of a rear portion of the shield intermediate its sides.

Fig. 4 is a plan of the top panes of the shield.

Fig. 5 is a perspective view of the shield in connection with an open car.

Fig. 6 is a side elevation of a shield provided with means at its front for discharging water outwardly of the opposite sides of the car.

Fig. 7 is a rear section of Fig. 6.

Fig. 8 is a detail showing the means for fixing the shield at a fixed angle with the sides of a car, Fig. 9 is a perspective view of the shield in connection with a closed car.

Fig. 10 is a side elevation thereof.

Fig. 11 is a detail showing the means for fixing the shield at the top of a closed car.

Fig. 12 is a longitudinal section of the shield.

Referring more particularly to the drawing for a detail description of my invention:—

Two planes 12 of translucent material such as green colored celluloid and of equal size are mounted in a rectangular frame about its margin, the frame including a rear angle bar 13, a front bar 14 and side angle bars 15. The bars 13 and 15 lie in the same plane which slopes downwardly and outwardly of the rear bar 13. The outward ends of the bars 15 are downturned and are joined by the bar 14 which lies in a plane at an angle with that of the bars 13 and 15. Intermediate the sides 15, the bars 13 and 14 are joined by an outwardly and downwardly curved or arched bar 16. The panes are of sufficient length to overlap at their adjacent edges, the overlapping portions being joined with the bar 16. The panes are held firmly in a fixed position and of fixed shape by screw heads and bars 17, 18, and 19, as shown in Figures 2, 3, and 7.

Each of the side angle bars 15, constitutes the top portion of a triangular side frame having the opposite end of each of the bars 15 connected with the angle bars 20 and 21. Mounted in said triangular frames are panes 22 fixed in position by screw heads and bars as shown in Fig. 7.

The translucent top shield is curved outwardly and downwardly and to either side of the intermediate bar 16, the curvature increasing gradually outwardly of its rear marginal portion and then making a sharp downward turn, the front down-turned marginal portion being of uniform curvature throughout the entire length of the shield, and the curvature on either side of the intermediate arched bar increasing gradually until it merges into the plane of the bars 13 and 15. Each top plane is rectangular when mounted but when unmounted it constitutes a trapezium, which as shown in Figure 4 may be obtained from the rectangular blanks shown bounded by full lines by cutting the blanks along the dotted lines, making an angle *a* less than a right angle.

The side frames as shown in Figures 6, 7, 10, are substantially triangular, the sides 15 being the longest sides of the triangle and sloping outwardly thus fixing the obliquity of the shield to slope outwardly and downwardly.

Each side 20 is provided with a hole at its rear upper corner 23, with a threaded hole near its lower corner 24 and with a slot for a curved perforated bar 25, adapted to be clamped by the winged bolt 26. See Figures 8 and 11.

To connect the shield with the posts 27, of an open car as shown in Figures 5, 6, 7, and 8, the curved bar 25 is pivotally connected with a bracket 28. The bracket is connected with a leaf of the double clamp 29, adapted to span the post 27 of the car and the leg of the pin 30, projected through the hole at the corner 23.

To connect the shield with a closed car as shown in Figures 9, 10 and 11, the shield is connected at the top of the car by hinges 31 and the curved bar 25 is pivotally connected with a bracket 32 attached to the front frame of the car.

It will be observed that the angle which the shield makes with the car shown in Fig. 6 is sharper than the angle shown in Fig. 10, although the inclination of the shield is supposed to be the same in all cases. This difference in the angles is taken care of by the curved bar 25.

The angular position of the shield with respect to the car will prevent rain, dust or snow from dashing against the portion of the windshield in front of the face of the driver, and will permit the opening of the windshield at the top of the vehicle to admit fresh air. The curvature of the top panes of the shield will cause rain water to shed in three directions and prevent its accumulation on top of the shield. The curvature of the shield will also focus sufficient rays of light in front of the driver and at the same time eliminate the glare.

In Figures 6 and 7, the shield is shown to be provided with a gutter 33 to direct water outwardly of the opposite sides of the shield, and to prevent the water from spattering the windshield.

What I claim is:

1. A shield comprising a forwardly and downwardly inclined surface which is partly plane and partly curved, the rear and side marginal portions being plane and lying in one and the same plane, the radius of curvature of the surface gradually decreasing frontwardly and outwardly of the rear and inwardly of the side marginal portion.

2. A shield comprising a frontwardly and downwardly inclined surface partly plane and partly curved, the rear and side marginal portion being plane and the central portion of the surface being curved up above the plane of the rear and side marginal portions, the curved portion being continuous with the rear and side marginal portions.

3. A shield comprising rear and side marginal portions lying in one and the same plane and an outwardly and frontwardly curved central portion, said central portion being curved up above the plane of the rear and side marginal portions and continuous with the plane of said marginal portions.

4. The combination of a frame, a flexible pane mounted therein, said frame including a rear and side strips lying in a horizontal plane and a strip intermediate the side strips extending from the rear strip and thence being bent outwardly and frontwardly, said pane having a marginal portion lying in the plane of the rear and sides of the frame and its central portion being curved up above the plane of the marginal portion and in alignment with the bent strip, the curved portion of the pane being continuous with the plane marginal portion.

5. The combination of a frame and a pane mounted therein, said frame including a rear strip and side strips lying with their upper surfaces in one and the same plane and a front strip lying with its front surface in a plane at an angle with the first plane, a strip intermediate the side strips having its rear end in the first plane and its front end in the second plane, the central portion of said intermediate strip being curved up above the plane of its rear end portion.

6. A shield consisting of three frames, an overhead frame and side frames supporting the overhead frame in an inclined plane, the overhead frame including a strip intermediate the side frames, said strip extending from the rear of the frame and being bent outwardly and frontwardly thereof, a pane mounted in said overhead frame, said pane having its rear and side marginal portions in the plane of the frame and its central portion in alignment with the bent strip, said central portion being curved up above the plane of the marginal portions and continuous therewith, and panes mounted in the side frames.

7. The combination claimed in claim 6, said overhead frame including a front strip lying with its front surface in a plane at an angle with that of the upper surfaces of the rear and side strips of said frame, the frame and the pane mounted therein being downturned in alignment with the plane of the front strip.

8. In a shield the combination of an overhead frame having its rear and sides lying in one plane and a strip intermediate the sides extending from the rear of the plane and bent outwardly and frontwardly thereof, a gutter in front of the frame joining the sides and lying in a plane at an angle with that of the frame, a pane mounted in said frame having its rear and side marginal portions in the plane of the frame and a central portion curved up above the plane of the marginal portions and in alignment with the bent strip, the pane being downturned in the front from the plane of the frame to that of the gutter.

9. The combination claimed in claim 8, including side frames supporting the overhead frame in an inclined plane and panes mounted in said side frames.

10. In combination with the front frame of an automobile an overheaded shield comprising a frame including a substantially rectangular top member and substantially triangular side members, the top member being supported by the side members in an inclined plane, semitransparent panes mounted in said frame, said shield provided at its rear where the top and side members are joined with means pivotally connecting the shield with the front frame of the automobile, and connecting means between the front frame of the automobile and the side members of the frame of the shield adapted to support the shield at an angle with that of the automobile frame.

11. The combination claimed in claim 10, said last named connecting means being adapted to permit of the changing of the angle of inclination between the shield and the front frame of the automobile at will, and clamping means adapted to hold the shield at a given angle of inclination.

12. The method of making a shield of the character described, which consists in mounting two blanks in the form of trapeziums each having a right angle in a rectangular space of a frame with the acute angles of the blanks adjacent each other and diagonally across from the right angles, bending the blanks in such a manner as to produce a surface having plane rear and side marginal portions and a central portion curved up above the plane of the marginal portions, and joining the blanks at their adjacent edges.

13. The method claimed in claim 12, and mounting the blanks at the connected edges in a cross-piece of the frame intermediate the side pieces of the frame and parallel therewith.

14. The method of making a shield of the character described which consists in mounting two blanks in a frame, bending the blanks in such a manner as to produce a surface having plane rear and side marginal portions and a central portion curved up above the plane of the marginal portions, joining the blanks at their adjacent edges, and bending the shield thus formed outwardly at the joint.

15. The method of making a shield of the character described which consists in cutting trapeziums each having a right angle of two blanks in such a manner as to make one of the sides longer than an opposite side and oblique with the sides adjacent said longer side, mounting the trapeziums in a rectangular space of a frame with the acute angles of the trapeziums adjacent each other and diagonally across from the right angles, bending the trapeziums in such a manner as to produce a surface having a marginal portion continuous with the plane of the frame and a central portion curved up above the plane of the frame and continuous with the marginal portion, and joining the adjacent edges of the trapeziums with a strip of the frame intermediate its sides strips.

16. The methods claimed in claim 15, and downturning the front marginal portion of the surface in a plane at an angle in alignment with the rear marginal portion thereof.

17. The method of making a shield of the character described which consists in cutting two trapeziums of a blank in such a manner as to make one of the sides of each trapezium longer than an opposite side, joining the trapeziums with their acute angles adjacent each other, and bending the joined parts until the marginal edges opposite the line joining the trapeziums are parallel with the said line.

18. The method claimed in claim 17, and mounting the joined parts in a rectangular frame.

19. The method of making a shield of the character described which consists in mounting two trapeziums in the rectangular spaces of a frame provided with a strip intermediate its sides, which strip has its central portion curved up above the plane of the rear and sides of the frame, the front surface of the frame being at an angle with the upper surface of its rear and parallel therewith.

In testimony whereof I hereunto affix my signature.

MATTHEW TANZOLA.

Certificate of Correction.

It is hereby certified that in Letters Patent No. 1,546,688, granted July 21, 1925, upon the application of Matthew Tanzola, of Newark, New Jersey, for an improvement in "Storm and Glare Shields and Methods of Making Same," errors appear requiring correction as follows: In the drawings Figure 12 should appear as shown below as part of the Letters Patent; page 1, line 66, for the word "planes" read panes; page 3, line 80, claim 15, for the word "sides" read side;

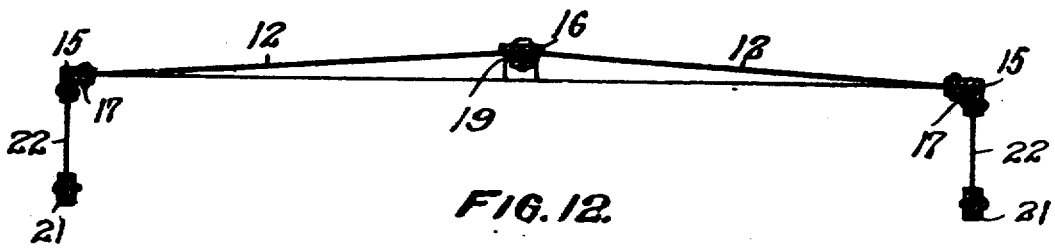

FIG. 12.

and that the said Letters Patent should be read with these corrections therein that the same may conform to the record of the case in the Patent Office.

Signed and sealed this 25th day of August, A.D. 1925.

Seal.

Karl Fenning
Acting Commissioner of Patents.